United States Patent
Dollar, Jr. et al.

(10) Patent No.: US 7,849,816 B2
(45) Date of Patent: Dec. 14, 2010

(54) VARMINT GUARD FEEDER AND METHOD OF USING SAME

(75) Inventors: B. Clyde Dollar, Jr., Burnet, TX (US); Robert Croft, Ingram, TX (US)

(73) Assignee: Diamond Wildlife Feeders, Ltd., Ingram, TX (US)

( * ) Notice: Subject to any disclaimer, the term of this patent is extended or adjusted under 35 U.S.C. 154(b) by 236 days.

(21) Appl. No.: 12/079,880

(22) Filed: Mar. 28, 2008
(Under 37 CFR 1.47)

(65) Prior Publication Data
US 2009/0241846 A1    Oct. 1, 2009

(51) Int. Cl.
*A01K 5/02* (2006.01)
(52) U.S. Cl. .................. 119/57.91; 119/57.92
(58) Field of Classification Search .......... 239/668, 239/681, 650, 687; 119/57.92, 52.1, 53, 119/57.1, 57.91, 51.01
See application file for complete search history.

(56) References Cited

U.S. PATENT DOCUMENTS

| | | | |
|---|---|---|---|
| 396,251 A * | 1/1889 | Adamson ................... 198/639 |
| 2,934,037 A * | 4/1960 | Ernest ....................... 119/56.1 |
| 3,742,913 A * | 7/1973 | Crippen ................... 119/51.11 |
| 4,027,627 A * | 6/1977 | Fillion ..................... 119/51.11 |
| 4,986,220 A * | 1/1991 | Reneau et al. ........... 119/57.91 |
| 5,820,035 A * | 10/1998 | Johnson et al. ............. 239/684 |
| 6,047,909 A * | 4/2000 | Simpson ..................... 239/687 |
| 6,637,678 B2 * | 10/2003 | Wyne ......................... 239/663 |

* cited by examiner

*Primary Examiner*—Rob Swiatek
*Assistant Examiner*—Kristen C Hayes
(74) *Attorney, Agent, or Firm*—The Matthews Firm

(57) ABSTRACT

A feed dispensing apparatus comprising a hopper to contain feed and a large sheet of metal adjustably attached below the base of the hopper. The base of the hopper has small openings to allow for feed to fall from the hopper to the sheet of metal below the hopper. The feed dispensing apparatus also comprises a motor and a fan blade which operate to disperse feed through the gap between the base of the hopper and the sheet of metal. The gap between the base of the hopper and the sheet of metal is adjustable in order to ensure that a specific type of varmint cannot gain access to the feed in the hopper.

9 Claims, 2 Drawing Sheets

VARMINT GUARD FEEDER AND METHOD OF USING SAME

TECHNICAL FIELD

This invention relates to an apparatus and methods for dispensing feed to fish, wildlife or livestock. More specifically, the present invention relates to dispersing feed while keeping varmints or other predators from stealing feed.

DETAILED DESCRIPTION OF EMBODIMENTS OF THE INVENTION

For a further understanding of the nature and objects of the present invention, reference should be had to the following detailed description, taken in conjunction with the accompanying drawings, in which like elements are given the same or analogous reference numbers.

It is well known in the art that a variety of different feeders and methods for dispersing the feed has been available for both wildlife and livestock, including but not limited to animals, birds, etc. The hoppers typically used in such feeders vary from closed containers or drums to uncovered or semi-covered troughs and a variety of other containers that provide access to the various animals, livestock or wildlife. Further, the dispersing of the feed from the hopper has also varied from the use of spinners with low voltage power sources such as batteries to more sophisticated controls such as photoelectric cells, which may turn on the feeder at daylight or after dark, as well as, more straightforward methods such as simple holes in the bottom of the hopper that allow the feed to fall by gravity or open troughs or other open areas, in which, as soon as the feed is eaten more feed it is drawn by gravity to replace it. However, the prior art does not provide for a method to disperse the feed in a predictable pattern, making it nearly impossible for varmints or other predators to steal feed.

Figure 1:
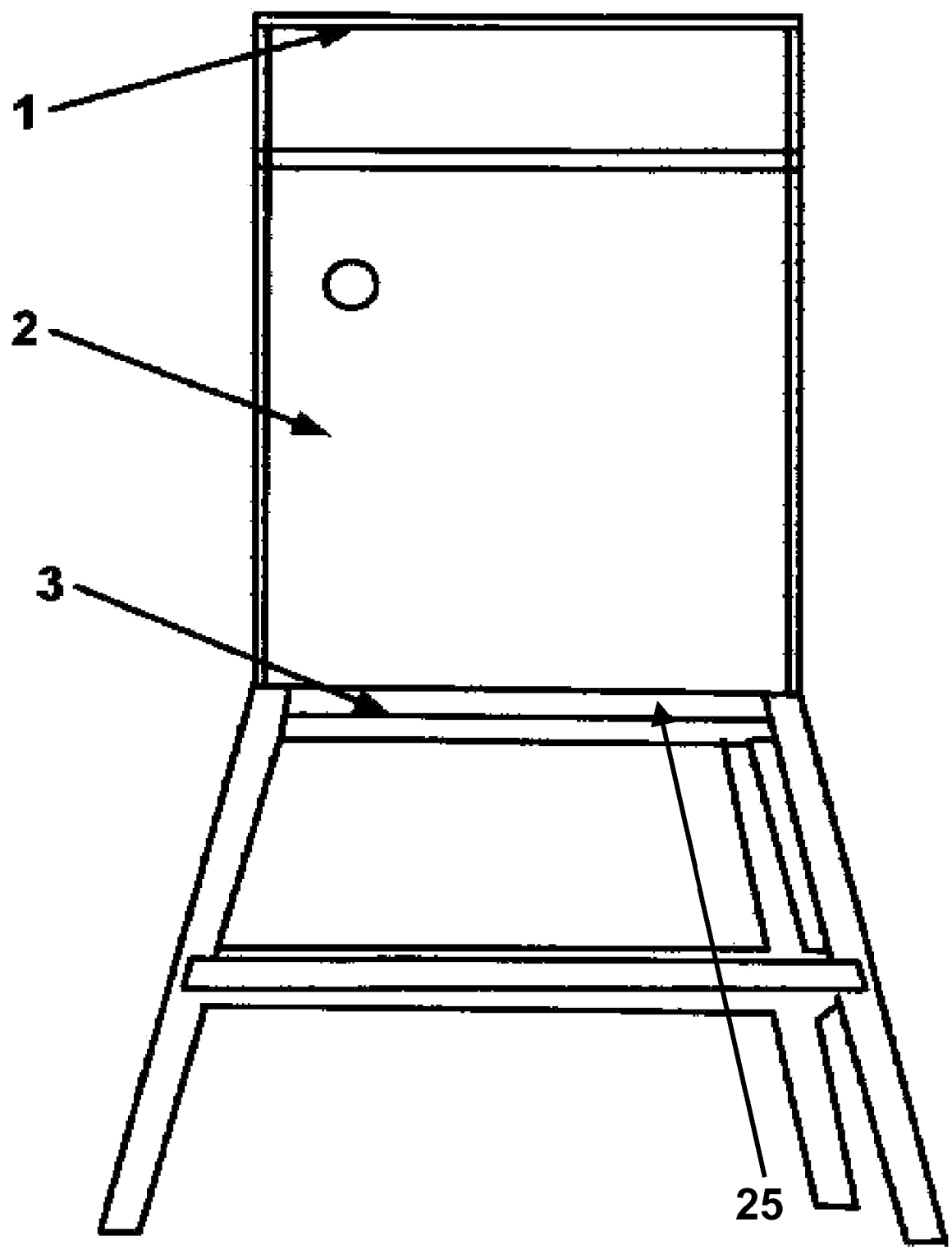
FIG. 1 is a pictorial representation of a front view of an embodiment of the varmint guard feeder according to the invention.

FIG. 1 represents an embodiment of a varmint guard feeder 1 according to the invention. The varmint guard feeder 1 consists of a hopper 2 for storing the feed and for housing a motor 4 (See FIG. 2). The varmint guard feeder 1 also consists of a flat sheet of strong metal 3 adjustably attached to the bottom of the hopper 2. The flat sheet of metal 3 may be adjustably attached to the hopper 2 by welding or some other conventional connection device, for example, nuts and bolts, metal screws and the like. Feed falls from the hopper 2 to the sheet of metal 3 and the sheet of metal 3 may be adjusted upward towards the hopper 2 or downward away from the hopper 2 in order to adjust the feed flow and in order to keep varmints or other predators from getting to the feed.

Figure 2:
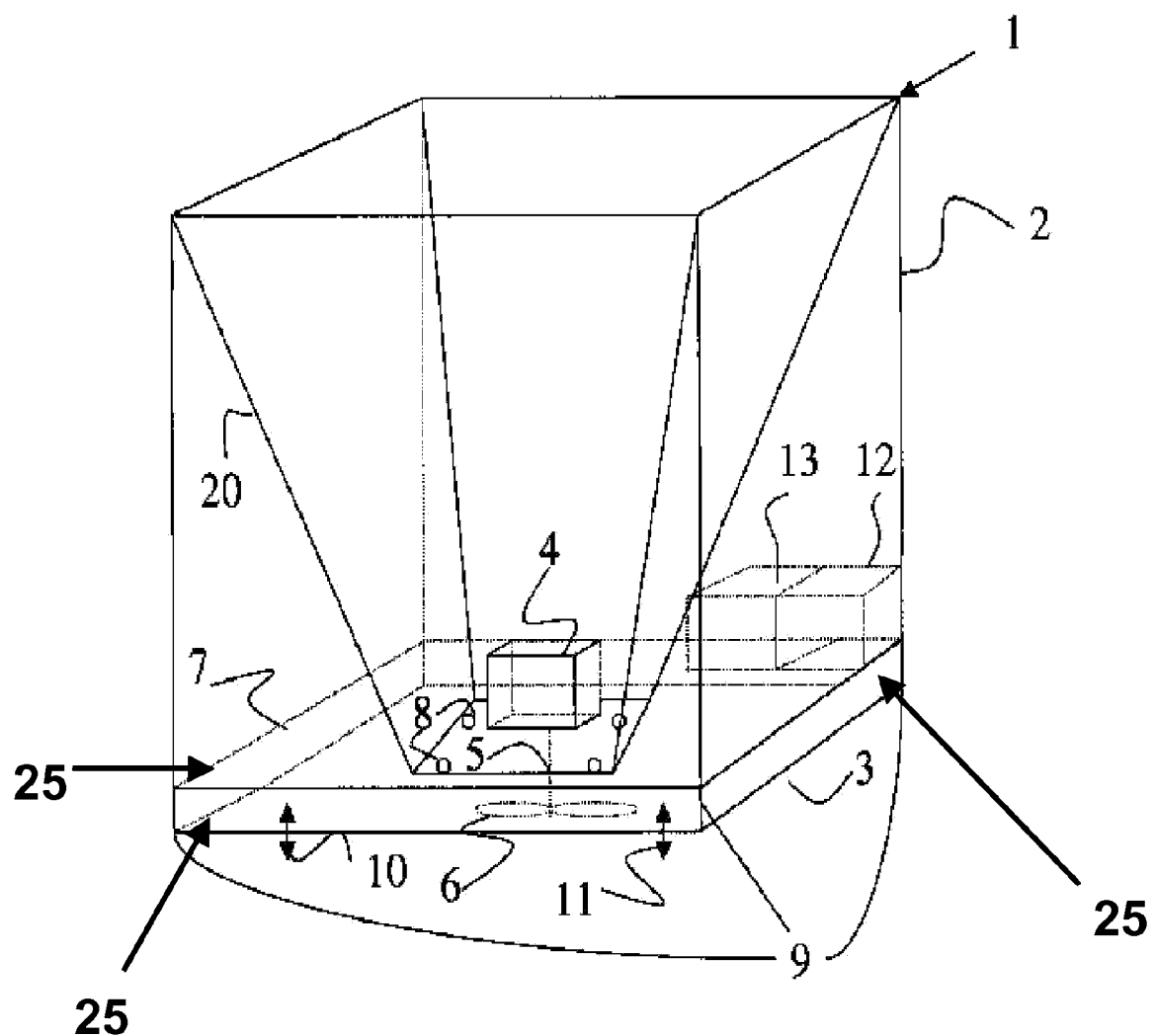
FIG. 2 illustrates an isometric front view of an embodiment of the varmint guard feeder according to the invention.

FIG. 2 represents an embodiment of a varmint guard feeder 1 according to the invention. A motor 4 is mounted within the hopper 2. The motor 4 may be fixedly attached to the base of the hopper 7 by welding or some other conventional connection device, for example, nuts and bolts, metal screws and the like. The motor shaft 5 preferably passes downward through the base of the hopper 7 and is fixedly attached by welding or some other conventional connection device, for example, nuts and bolts, metal screws and the like to a fan blade 6. The fan blade 6 may be shaped in any conventional way such as, but not limited to, an S-shaped, or a multi-finger fan blade (see co-pending U.S. patent application Ser. No. 12/315,245, titled Multi-Finger Spinner Feeder and Method of Using Same to Rieger), etc. The base of the hopper 7 preferably has small openings 8 for the feed to fall through the base of the hopper 7 and onto the fan blade 6 and sheet of metal 3. The sheet of metal 3 is preferably adjustably mounted to the base of the hopper 7 by members 9, which may be attached to the base of the hopper 7 and to the sheet of metal 3 by welding or some other conventional connection device, for example, nuts and bolts, metal screws and the like. Feed falls from the hopper 2 to the sheet of metal 3 through the openings 8, and the sheet of metal 3 may be adjusted upward towards the hopper 2 or downward away from the hopper 2 in order to adjust the feed flow and in order to keep varmints or other predators from getting to the feed. The arrows 10 and 11 represent the direction upon which the sheet of metal 3 may be adjusted in relation to the base of the hopper 7. The feed is dispersed out from the hopper 2 through the gap and/or one or more windows 25 disposed between the base of the hopper 7 and the sheet of metal 3 when the motor 4 is running and causing the fan blade 6 to spin. FIGS. 1 and 2 together illustrate any sides of the hopper 2 may have a corresponding window 25 disposed between the side and the sheet of metal 3. In an embodiment, one or more of the windows 25 may be defined by, for example, an area between the bottom edge of a side (i.e., outer edge of the base of the hopper 7), the members 9, and the corresponding edge of sheet of metal 3. The fan blade 6 causes feed that falls from the base of the hopper 7 through the openings 8 and onto the sheet of metal 3 or fan blade 6 to disperse in all directions through the gap between the base of the hopper 7 and the sheet of metal 3.

Inside the hopper 2 is a rectangular funnel 20 that directs feed down toward the openings 8 in the base of the hopper 7. The hopper 2 is filled with feed and the feed slides down the sides of the funnel 20 and through the openings 8 onto the sheet of metal 3 and the fan blade 6.

A battery 12, or some other conventional source of power, is used to operate the motor 4. It should be appreciated that the motor 4 may be any variety of conventional motors. Preferably the motor 4 is a digitally controlled motor having a controller therein, which can be programmed so as to control the operation of motor 4. Therefore, motor 4 may be programmable to run for some predetermined time, such as, 10 seconds, 20 seconds, 30 seconds, etc and at a variety of times during the day, such as, 3 times a day, 4 times a day, 6 times a day, etc. It should be understood that the exact duration of motor operation, as well as, the number of feedings or number of operations per day would be dependent on facts, such as but not limited to, the amount of wildlife or livestock to be fed, the type of wildlife or livestock to be fed, the time of year and feeding habits of the wildlife or livestock, as well as a variety of other feeding factors. It should be further understood, that other motors 4 may be used and as such it would be preferable to have a local controller 13 so as to allow the programming of the motor operation including cycle duration as well as number of cycles.

In operation, the hopper 2 is filled with feed. The feed falls from the hopper 2 through the openings 8 and onto the fan blade 6 and sheet of metal 3. The feed is dispersed through the gap between the base of the hopper 7 and the sheet of metal 3 when the fan blade 6 begins to spin in response to the activation of the motor 4, which spins the motor shaft 5 attached to the fan blade 2. When the fan blade 6 begins to rapidly spin, the feed disperses in all directions through the gap between the base of the hopper 7 and the sheet of metal 3.

A battery 12, or some other conventional method such as electricity, is used to operate the motor 4. It should be appreciated that the motor 4 may be any variety of conventional motors. Preferably the motor 4 is a digitally controlled motor having a controller therein, which can programmed so as to control the operation of motor the 4. Therefore, the motor 4 may be programmable to run for some predetermined time, such as, 10 seconds, 20 seconds, 30 seconds, etc and at a variety of times during the day, such as, 3 times a day, 4 times a day, 6 times a day, etc. It should be understood that the exact duration of motor 4 operation, as well as, the number of feedings or number of operations per day would be dependent on facts, such as but not limited to, the amount of wildlife or livestock to be fed, the type of wildlife or livestock to be fed, the time of year and feeding habits of the wildlife or livestock, as well as a variety of other feeding factors. It should be further understood, that other motors may be used and as such it would be preferable to have a local controller 13 so as to allow the programming of the motor operation including cycle duration as well as number of cycles.

The invention claimed is:

1. A feed dispensing apparatus comprising:
   a hopper for containing feed, said hopper having a base, four sides and a top;
   a sheet of metal mounted below said base of said hopper;
   at least one gap disposed between the hopper and the sheet of metal, wherein the at least one gap is configured for distribution of feed to a predetermined wildlife, and wherein the at least one gap is further configured to protect the feed contained in the dispensing apparatus from a predetermined varmint;
   at least one window disposed between each of the four sides and the sheet of metal mounted below the base;
   a motor fixedly attached to the base of said hopper;
   a rotating motor shaft being powered by said motor, wherein said motor shaft passes downward through said base of said hopper;
   a fan blade fixedly fastened to said motor shaft, wherein said motor causes said fan blade to rotate and move feed that falls onto said blade; and
   a plurality of openings in said base of said hopper, wherein said feed passes through said openings and onto said fan blade and said sheet of metal;
   wherein the windows and the at least one gap are configured to provide a feed stream in all radial directions as the fan blade rotates.

2. The feed dispensing apparatus of claim 1, wherein operation of said motor is controlled by a programmable controller.

3. The feed dispensing apparatus of claim 1, further comprising a controller to allow the programming of said motor operation.

4. The feed dispensing apparatus of claim 1, further comprising a battery for supplying power to said motor, wherein the motor is disposed in the hopper.

5. The feed dispensing apparatus of claim 1, wherein the predetermined wildlife is a land-based animal.

6. A method for dispersing feed comprising:
   providing a hopper for containing feed, said hopper having a base, four sides and a top;
   providing a sheet of metal mounted below said base of said hopper;
   disposing at least one gap between the hopper and the sheet of metal, wherein the at least one gap is configured for distribution of feed to a predetermined wildlife, and wherein the at least one gap is further configured to adequately protect the feed contained in the dispensing apparatus from a predetermined varmint;
   at least one window disposed between each of the four sides and the sheet of metal mounted below the base;
   providing a motor fixedly attached to the base of said hopper;
   providing a rotating motor shaft being powered by said motor, wherein said motor shaft passes downward through said base of said hopper;
   providing a fan blade fixedly fastened to said motor shaft; said motor causing said fan blade to rotate; and
   providing a plurality of openings in said base of said hopper, wherein said feed passes through said openings and onto said fan blade and said sheet of metal, wherein said fan blade moves feed that falls onto the blade, and wherein the windows and the at least one gap are configured to provide a feed stream in all radial directions as the fan blade rotates.

7. The method of claim 6, wherein the motor is digitally controlled to allow for the programming of the motor operation.

8. The method of claim 6, further providing a controller to allow for the programming of said motor operation.

9. The method of claim 6, further providing a battery for supplying power to said motor.

* * * * *